United States Patent
Stählin et al.

(10) Patent No.: US 9,450,691 B2
(45) Date of Patent: Sep. 20, 2016

(54) METHOD AND DEVICE FOR SYNCHRONIZING NETWORK SUBSCRIBERS IN AN ON-BOARD NETWORK OF A VEHICLE

(75) Inventors: Ulrich Stählin, Eschborn (DE); Heinrich Acker, Schwalbach (DE)

(73) Assignee: CONTINENTAL TEVES AG & CO. OHG, Frankfurt (DE)

(*) Notice: Subject to any disclaimer, the term of this patent is extended or adjusted under 35 U.S.C. 154(b) by 139 days.

(21) Appl. No.: 14/344,341

(22) PCT Filed: Sep. 12, 2012

(86) PCT No.: PCT/EP2012/067848
§ 371 (c)(1),
(2), (4) Date: Mar. 12, 2014

(87) PCT Pub. No.: WO2013/037829
PCT Pub. Date: Mar. 21, 2013

(65) Prior Publication Data
US 2014/0334477 A1    Nov. 13, 2014

(30) Foreign Application Priority Data
Sep. 12, 2011   (DE) .................. 10 2011 082 521

(51) Int. Cl.
H04J 3/06    (2006.01)
H04L 12/40   (2006.01)
G06F 1/12    (2006.01)
H04W 56/00   (2009.01)

(52) U.S. Cl.
CPC .............. *H04J 3/0602* (2013.01); *G06F 1/12* (2013.01); *H04J 3/0638* (2013.01); *H04J 3/0655* (2013.01); *H04L 12/40039* (2013.01); *H04W 56/0015* (2013.01); *H04J 3/0644* (2013.01)

(58) Field of Classification Search
None
See application file for complete search history.

(56) References Cited

U.S. PATENT DOCUMENTS

| | | | |
|---|---|---|---|
| 5,490,075 A | * | 2/1996 | Howard et al. ............ 701/468 |
| 6,542,808 B2 | * | 4/2003 | Mintz .................. G08G 1/01 340/934 |
| 6,816,510 B1 | * | 11/2004 | Banerjee ................... 370/503 |
| 7,075,898 B2 | | 7/2006 | Weigl et al. |
| 7,260,652 B2 | | 8/2007 | Fuehrer et al. |
| 7,362,834 B2 | | 4/2008 | Fuehrer et al. |

(Continued)

FOREIGN PATENT DOCUMENTS

| EP | 1 355 459 A2 | 10/2003 |
|---|---|---|
| JP | 11-115627 A | 4/1999 |
| WO | 2012/101229 A1 | 8/2012 |

OTHER PUBLICATIONS

International Search Report of PCT/EP2012/067848, Mailed Dec. 17, 2012, 3 pages.

(Continued)

*Primary Examiner* — Phirin Sam
(74) *Attorney, Agent, or Firm* — Brinks Gilson & Lione

(57) ABSTRACT

A method is disclosed for synchronizing network subscribers in an on-board network of a vehicle, the method comprising: receiving a message dependent on a first clock present in a first network subscriber by at least one second network subscriber if a predetermined condition has been satisfied, and synchronizing a second clock in the second network subscriber on the basis of the message dependent on the first timer if the predetermined condition has been satisfied.

12 Claims, 2 Drawing Sheets

(56) References Cited

U.S. PATENT DOCUMENTS

| | | | |
|---|---|---|---|
| 7,920,587 B2 | 4/2011 | Fuehrer | |
| 7,965,678 B2 * | 6/2011 | Giacomazzi | H04W 84/00 370/329 |
| 7,999,697 B2 * | 8/2011 | Jia | G07B 15/063 340/909 |
| 8,321,612 B2 | 11/2012 | Hartwich et al. | |
| 8,452,477 B2 * | 5/2013 | Ergen | B60C 23/0461 340/442 |
| 8,682,581 B2 * | 3/2014 | Psiaki | G01C 21/28 342/357.2 |
| 2002/0183864 A1 | 12/2002 | Apel | |
| 2004/0123174 A1 * | 6/2004 | Dhupar et al. | 713/401 |
| 2005/0141565 A1 * | 6/2005 | Forest | H04J 3/0652 370/503 |
| 2005/0171662 A1 * | 8/2005 | Strege | G01B 21/26 701/31.4 |
| 2007/0030841 A1 * | 2/2007 | Lee et al. | 370/352 |
| 2007/0033294 A1 | 2/2007 | Ungermann et al. | |
| 2007/0094528 A1 | 4/2007 | Fredriksson et al. | |
| 2008/0040023 A1 * | 2/2008 | Breed | B60N 2/2863 701/117 |
| 2008/0075214 A1 * | 3/2008 | Shimoyama | 375/354 |
| 2009/0279651 A1 | 11/2009 | Ungermann | |
| 2010/0026520 A1 * | 2/2010 | Witte et al. | 340/908 |
| 2011/0160951 A1 | 6/2011 | Ishigooka et al. | |
| 2012/0146701 A1 * | 6/2012 | Lai et al. | 327/295 |
| 2013/0006464 A1 * | 1/2013 | Speiser | G08G 1/01 701/25 |
| 2013/0189922 A1 | 7/2013 | Dittrich et al. | |

OTHER PUBLICATIONS

Ting-Ying Wei et al: "Implementation of In-Vehicle Multi-sensor Information Fusion Gateway for Cooperative Driving," Intelligent Systems, Modelling and Simulation (ISMS), 2011 Second International Conference on, IEEE, Jan. 25, 2011, pp. 19-24, XP031930731, DOI: 10.1109/ISMS.2011.13, ISBN: 978-1-4244-9809-3, Abstract; Figure 1, p. 20, paragraph II.

* cited by examiner

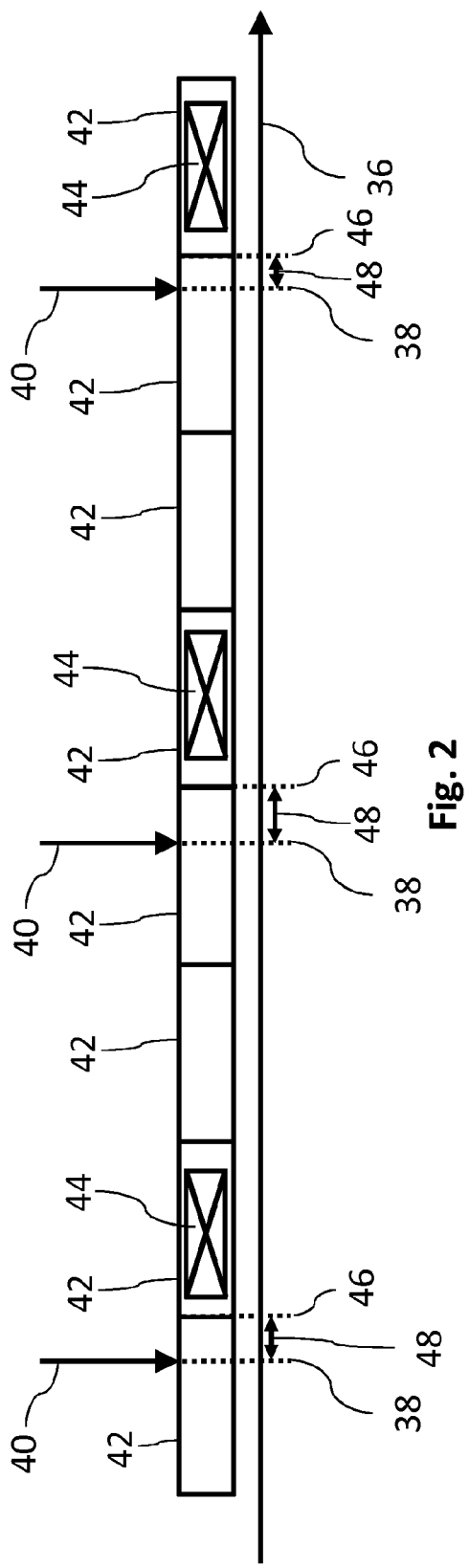
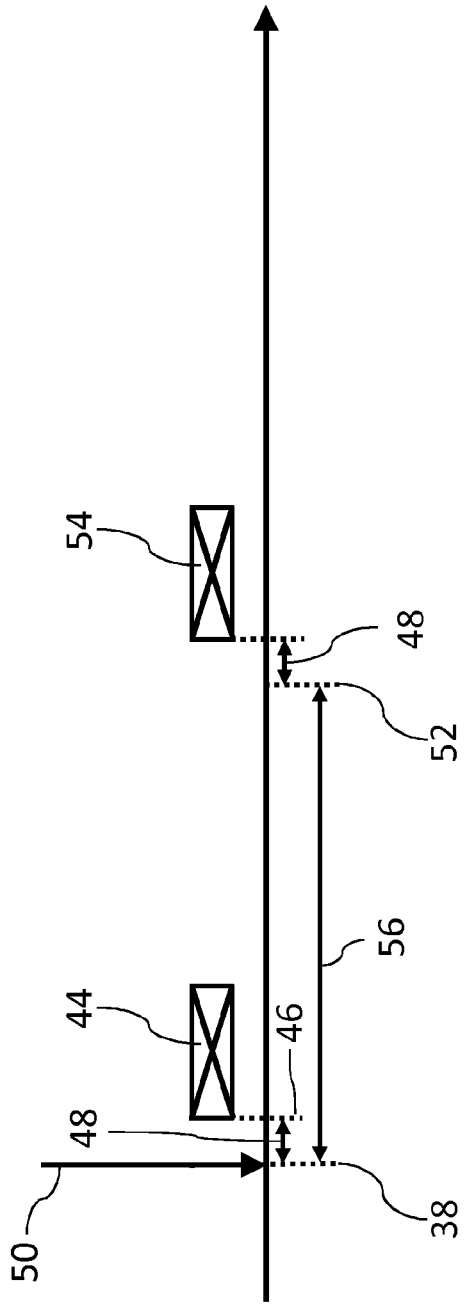

METHOD AND DEVICE FOR SYNCHRONIZING NETWORK SUBSCRIBERS IN AN ON-BOARD NETWORK OF A VEHICLE

CROSS-REFERENCE TO RELATED APPLICATIONS

This application claims priority to German Patent Application No. 10 2011 082 521.5, filed Sep. 12, 2011, and International Patent Application No. PCT/EP2012/067848, filed Sep. 12, 2012.

FIELD OF THE INVENTION

The invention relates to a method for synchronizing network subscribers in an onboard network in a vehicle, a control apparatus for performing the method and to a network subscriber having the control apparatus.

BACKGROUND OF THE INVENTION

JP 11 115 627 A discloses the practice of connecting two network subscribers that are connected to a data bus to an additional dedicated line in order to synchronize the timings of said network subscribers to one another.

It is an object of the invention to improve the timing synchronization of network subscribers connected to a data bus.

SUMMARY AND INTRODUCTORY DESCRIPTION OF THE INVENTION

The object is achieved by the technical features disclosed herein and by way of the method disclosed herein.

According to one aspect of the invention, a method for synchronizing network subscribers in an onboard network in a vehicle comprises the steps of: receiving a message that is dependent on a first timer that is existent in a first network subscriber by at least one second network subscriber when a predetermined condition is satisfied, and synchronizing a second timer in the second network subscriber on the basis of the message that is dependent on the first timer when the predetermined condition is satisfied.

The method is based on the consideration that the dedicated line for synchronizing the timings of network subscribers that are existent in a vehicle network grows with the number of network subscribers, particularly because the individual network subscribers need to be connected to the dedicated line in star form, since the inevitable latencies would otherwise result in nonsynchronous reception of the relevant synchronization signal, which would render timing synchronization impossible.

On the basis of this consideration, the specified method involves recognition of the fact that, although it would be possible to perform the synchronization via the onboard network of the vehicle, there would be need to guarantee that the latencies during reception of the synchronization signal do not result in all network subscribers ultimately having their timings synchronized at different times.

The concept behind the specified method is to arrange with all network subscribers a particular time at which the synchronization needs to be performed. For this reason, the specified method proposes stipulating at least one predetermined condition that allows each network subscriber to recognize imminent synchronization and prompts said network subscriber to expect to receive the message that is suitable for synchronization. This predetermined condition may be arbitrary, which is part of the subject matter described herein.

In one development, the specified method comprises the steps of: synchronizing the first timer on the basis of a reference time; and sending of the message to be received on the basis of the synchronized first timer.

In an additional development of the specified method, the reference time is derived from a wirelessly received signal. This wirelessly received signal may, in principle, be any desired signal that is suitable for synchronizing the timings of the individual network subscribers. Thus, the wirelessly received signal may be a DCF77 signal, for example, which is used in Europe for synchronizing timers by radio, or the carrier frequency of a radio transmitter, the carrier frequency value of the latter being able to be derived on the basis of the radio transmitter itself, for example.

With particular preference, the wirelessly received signal is a global navigation satellite system signal, GNSS signal for short, GNSS signals—for technical reasons—being signals with high-precision timing that allow network subscribers in the form of sensors in a vehicle to have their timings synchronized with a correspondingly high level of precision. Such synchronization is currently at the focus of current development pertaining to Car2X communication, that is to say data interchange from a vehicle to other vehicles or systems in the surroundings, such as traffic lights or other infrastructure components. The interchange of information about accidents and other hazard locations, about the condition of the road, road signs and much more makes it possible to attain an increase in safety and convenience. In many cases, this needs to involve the information being provided in real time. In order to ensure this real time, the information can be provided with a high-precision time stamp, for example, which is linked to the information by the respective network subscriber. This time stamp needs to have a correspondingly high level of precision, however, which is ensured by the synchronization on the basis of the GNSS signal. The GNSS signal used may be a global positioning system signal, GPS signal for short, a Глобальная Навигационная Спутниковая Система signal, GLONASS signal for short, or a Galileo signal, for example.

In one particular development of the specified method, the predetermined condition is time-triggered. The time trigger, that is to say the time release for the synchronization, may be of arbitrary embodiment. By way of example, it is thus possible for clocks to be provided within the individual network subscribers, which clocks run with a particular basic precision and permit sufficiently exact time release of the time-controlled synchronization.

In one preferred development of the specified method, the time-triggered condition is the timing of a time slot in a time division multiple access data transmission method, TDMA data transmission method for short, in the network. Such a TDMA data transmission method is used by various network protocols, such as FlexRay, PSI5, LIN, etc. Since these protocols are known to a person skilled in the art, they will not be described in more detail. The development is based on the consideration that a TDMA data transmission method already requires very precise synchronization of the individual network subscribers among one another in order to be able to use data in time slots without great bandwidth losses. These bandwidth losses are essentially dependent on a lack of synchronization, that is to say on the uncertainty of when it is clear for all network subscribers when a time slot begins and when it ends. This base synchronization, which exists anyway for the operation of the TDMA method in the bus system, is now used in order to transmit the message that is dependent on the first timer with sufficient precision too.

In an alternative particular development of the specified method, the predetermined condition is event-triggered. The event-dependent trigger, that is to say the event-dependent release for the synchronization, may likewise be of arbitrary embodiment. Whereas the time-dependent trigger operates deterministically from a point of view of timing, so that the synchronization takes place in a predictable manner, the event-oriented trigger operates stochastically, so that the synchronization takes place randomly from the point of view of timing, depending on when the event takes place. However, it would also be possible to enforce the random event by virtue of the onboard network of the vehicle being transferred to a particular state, for example, from which each network subscriber recognizes the imminent synchronization. Such an event-triggered method lends itself, by way of example, to all network protocols in which no temporally recurrent structures can be recognized on all network subscribers collectively, such as in the case of the CAN bus that is known to a person skilled in the art.

In one preferred development of the specified method, the event-triggered condition is the output of a predetermined sensor signal. This sensor signal may be in any form. This development is possible for all network subscribers that are able to detect a common event, that is to say by means of sensors, such as acceleration, rotation rate, camera, etc. Each appliance involved in the synchronization logs the detection time and possibly the duration of detection for the predetermined sensor signal as an event-triggered condition, which may be a bollard or a particular curve, for example. The message that is dependent on the first timer is thus sent via the onboard network when the event-triggered condition has arisen and the relevant network subscribers expect to receive said message.

With particular preference, the message that is dependent on the first timer contains a current time that the first timer outputs when the message is produced.

According to a further aspect of the invention, a control apparatus is set up to perform one or more of the specified methods.

In one development of the specified control apparatus, the specified apparatus has a memory and a processor. In this case, the specified method is stored in the memory in the form of a computer program and the processor is provided for executing the method when the computer program is loaded from the memory into the processor.

According to a further aspect of the invention, a computer program comprises program code means in order to perform all the steps of one of the specified methods when the computer program is executed on a computer or one of the specified apparatuses.

According to a further aspect of the invention, a computer program product contains a program code that is stored on a computer-readable data storage medium and that, when executed on a data processing device, performs one of the specific methods.

According to a further aspect of the invention, a network subscriber for an onboard network in a vehicle comprises a specified control apparatus.

BRIEF DESCRIPTION OF THE DRAWINGS

The properties, features and advantages described above for this invention and also the manner in which they are achieved become clearer and more distinctly comprehensible in connection with the description below of the exemplary embodiments, which are explained in more detail in connection with the figures of an exemplary embodiment, in which:

FIG. 2 shows a basic illustration of a TDMA transmission, and

FIG. 3 shows a basic illustration of a transmission via a CAN bus.

DETAILED DESCRIPTION OF THE INVENTION

Figure 1:
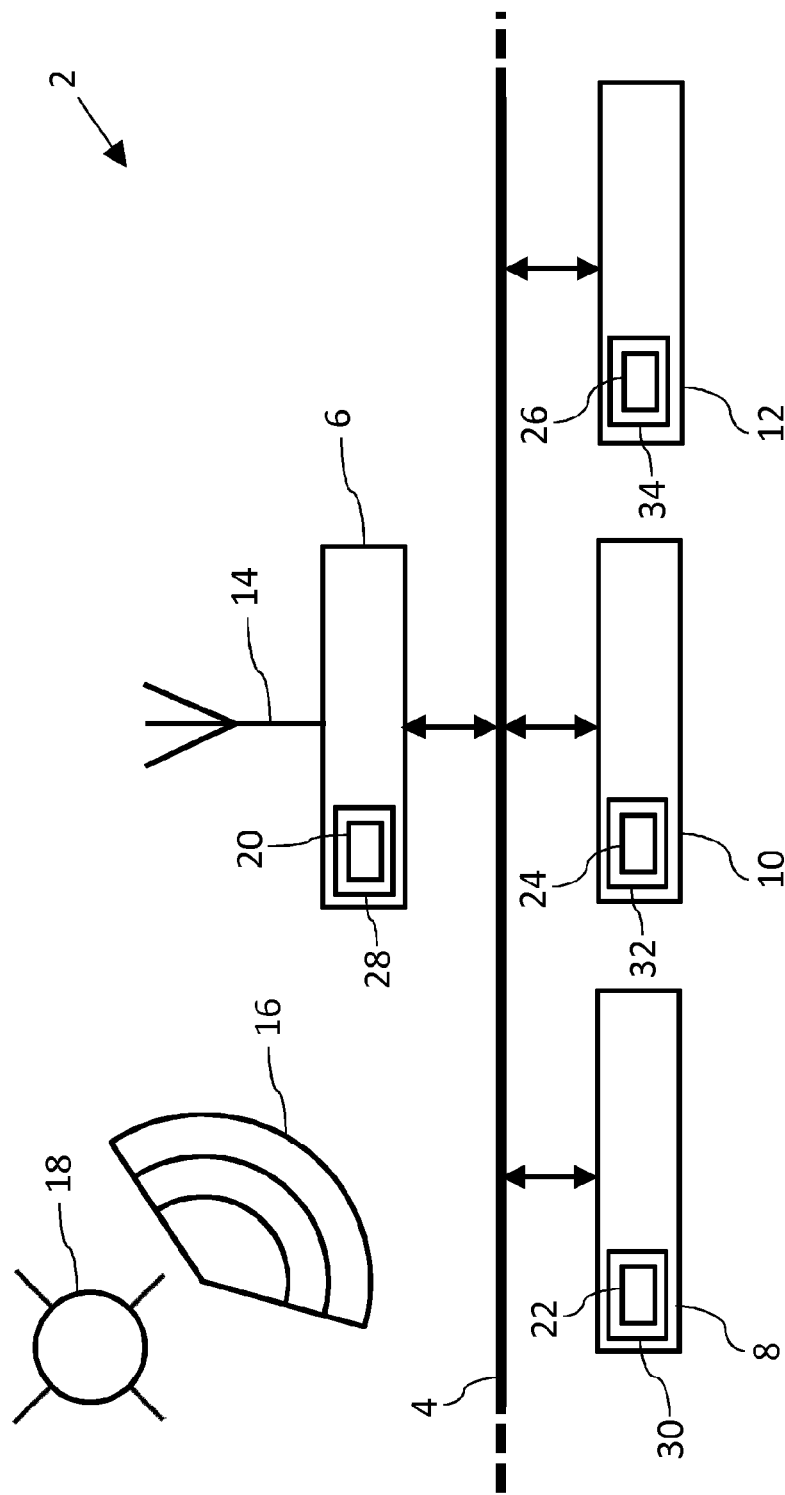
FIG. 1 shows a basic illustration of an onboard network for a vehicle.

In the figures, technical elements that are the same are provided with the same reference symbols and are described only once.

Reference is made to FIG. 1, which shows a basic illustration of an onboard network 2 for a vehicle that is not shown further.

The onboard network 2 comprises a data bus 4, which may be in the form of a FlexRay bus that is known to a person skilled in the art or in the form of a CAN bus that is known to a person skilled in the art, for example. In the present embodiment, four network subscribers 6, 8, 10, 12 are connected to the data bus 4 bidirectionally.

In the present embodiment, the first network subscriber 6 is in the form of a GNSS receiver 6 and has a GNSS antenna 14 that it can use to receive GNSS signals 16 from a GNSS satellite 18 in a manner that is known per se to a person skilled in the art. The GNSS signals 16 are used primarily for absolute location of the vehicle—not shown further—in the space. Alternatively, however, the GNSS receiver 6 may also be part in the first network subscriber 6, which may be in the form of a navigation appliance, for example, or, as an integrated communication unit, combines a wide variety of communication and reception modules.

In the present embodiment, the second network subscriber 8 and the third network subscriber are in the form of sensors. In the present case, the second network sensor 8 is meant to be in the form of an inertial sensor 8, which, in a manner that is not shown further, senses accelerations and rotation rates for the vehicle that is not shown further and sends them to the data bus 4. In the present embodiment, the second sensor 10 is meant to be in the form of a wheel speed sensor 10, which, in a manner that is not shown further, senses the wheel speed of one or more wheels of the vehicle that is not shown further and sends it to the data bus 4. The data bus 4 may have further sensors, such as a steering angle sensor, connected to it, which sense further variables, such as a steering angle for the vehicle that is not shown further, and sends them to the data bus 4.

In the present embodiment, the third network subscriber 12 is in the form of what is known as a fusion sensor 12. The fusion sensor 12 is meant to connect conventional driving dynamics sensors, such as the output data from the inertial sensor 8 and the wheel speed sensor 10, to the GNSS raw data from the GNSS receiver 6. The "external anchor" comprising the GNSS raw data thus allows the fusion sensor 12 to improve the output data from the inertial sensor 8 and the wheel speed sensor 10 and to deliver them with greater reliability. The main advantage, however, is the possibility of delivering a very precise position for the vehicle that is not shown further. In this case, the position can, in principle, be delivered with lane precision. What is important in this case is the very exact timing synchronization of all data sources involved, that is to say of all sensors 8, 10, the fusion sensor 12 and the GNSS receiver 6, to a time base with an error of less than 100 μs. In this regard, each network subscriber 6 to 12 accordingly has a clock 22 to 26 that, by way of example, is respectively accommodated in a corresponding transmission device 28 to 34 for sending and receiving the synchronized data. In the present embodiment, the time base for synchronizing the clocks 22 to 26 comes from the GNSS receiver 6 in this case, since this provides an external reference that is of high precision on account of the system. The sensor 8 and 10 may also be part of the fusion sensor 12.

The synchronization of the clocks 20 to 26 is described below with reference to two methods.

Reference is made to FIG. 2, which shows a basic illustration of synchronization over time 36 on the basis of a TDMA transmission.

By way of example, the TDMA method is used in the FlexRay system cited further above, the performance of TDMA already requiring very precise synchronization between transmitter and receiver in order to be able to use the time slot method known to a person skilled in the art without great bandwidth losses. The reason is that the bandwidth losses consist in a pause in the length of the uncertainty of the synchronization being required at the start and end of every data transmission by a bus subscriber. The base synchronization that is existent anyway for operation of the bus system is now used in order to transmit the time pulse with sufficient precision too.

In this regard, the GNSS receiver 6 can first of all produce a time pulse 40 at a reception time 38 on the basis of the reception of the GNSS signal 16.

First, the clock 20 of the transmission module 28 in the GNSS receiver 6 is synchronized on the basis of this time pulse 40 in a manner that is not shown. This can be accomplished either by hard setting of the clock 20 to the time pulse 40 or by adjusting the clock 20 to the time pulse 40. The hard setting of the clock 20 can cause "skips" in time 36, which are not shown further. If these are not wanted, adjustment to the time pulse 40 is more advantageous. In this case, a time difference between the time pulse 40 and the clock 20 over a prescribed length of time and possibly also a plurality of time pulses 40 is reduced to the extent that a threshold value for the time difference is observed. This can also be achieved by customizing PLLs or DLLs—which are known to a person skilled in the art—of the clock 20 of the transmission module 28. Hard setting and adjustment can also be combined.

In this case, the transmission module 28 in the GNSS receiver 6 has, for the synchronization of the clocks 20 to 26 of all network subscribers 6 to 12 on the data bus 4, the role of a master that outputs a synchronization instruction that is followed by the remainder of the network subscribers 8 to 12.

This synchronization instruction is transmitted in a next time slot 42—following the reception time—of the TDMA-based bus system as a message 44—shown as a cross in FIG. 2—that uses its timing 46 to convey the reception of the time pulse 40, besides the unreduced data payload. Ideally, this message 44 additionally incorporates the latency 48 between the reception time 38 of the time pulse 40 and the start 46 of the time slot 42 used for transmitting the message 44, in order to allow even more precise synchronization.

Upon receiving the message 44 via the data bus 4, the other network subscribers 8 to 12 synchronize their respective clock 20 to 26, if possible with the correction using the additional information about the latency 48.

As an extension, it is also possible for one or more alternative messages, not shown in FIG. 2, that contain a high-precision time stamp to be sent between the messages 44 that contain the time pulse 40 or instead of messages 44 that contain the time pulse 40.

The method described within the framework of FIG. 2 allows continuous synchronization of the clocks 20 to 26 of the individual network subscribers 6 to 12 in the data bus 4, since the data bus 4 used as a TDMA bus has a temporally deterministic response.

Reference is made to FIG. 3, which shows a basic illustration of synchronization over time 36 on the basis of a transmission via a CAN bus as data bus 4.

In the case of a data bus 4 that exhibits a nondeterministic timing response, for which reception of the time pulses 40 by the network subscribers 8 to 12 cannot be expected over time, such as in the case of the CAN bus, a characteristic event 50 that can be sensed by all network subscribers 8 to 12 that are to be synchronized can be used so that said subscribers can expect to receive the time pulses 40. In a way, it is possible for reception to be signaled to said subscribers.

In the present embodiment, a characteristic event 50 of this kind can be sensed by means of the sensor system of the network subscribers 6 to 12, such as acceleration, rotation rate, camera, etc. Each network subscriber 6 to 12 involved in the synchronization logs the detection times and possibly the duration of detection for characteristic events 50, which may be in the form of a bollard on in the form of a curve, for example. One of the network subscribers 6 to 12 must again act as a "master" in similar fashion to FIG. 2, ideally a network subscriber 6 to 12 that is already in sync with a very precise time by means of the GNSS signal 16. In the present embodiment, the GNSS receiver 6 will again be treated as a master. If the GNSS receiver 6 recognizes a characteristic event 50 via a sensor system that has been connected to the GNSS receiver 6 especially or that is existent on the GNSS receiver 6 anyway, said event also being able to be detected by the respective other network subscribers 8 to 12, then a message 44 that marks the time 38 of recognition of the characteristic event is sent via the data bus 6.

The message 44 may be a simple signal. Preferably, the message 44 additionally contains the delay 48 that has passed since the characteristic event 50 up to the time 46 of the message 44 being sent. This message 44 shall expediently be sent with very high priority for access to the data bus 4 so that no unknown delays are produced by access to the data bus 4. All network subscribers 8 to 12 synchronize themselves to the received message and align their clocks 22 to 26 therewith.

With particular preference, where the characteristic event is at an event end 52, a second message 54 could be sent by the GNSS receiver 6 in the form of a master if a characteristic event 50 with a sufficiently long event duration 56 is involved. This second message 54 communicating the event end 52 may additionally contain the duration 54 of the characteristic event 50. Hence, the other network subscribers 8 to 12 connected to the data bus 4 have three pieces of information—event start 38, event end 52 and event duration 56—relating to the characteristic event 50 and can accordingly customize their clocks 22 to 26 better.

The method described allows distributed time stamping to take place, and not all data need to pass through a central system.

While the above description constitutes the preferred embodiment of the present invention, it will be appreciated that the invention is susceptible to modification, variation, and change without departing from the proper scope and fair meaning of the accompanying claims.

The invention claimed is:

1. A method for synchronizing network subscribers in an onboard network in a vehicle, the method comprising:
synchronizing a first timer of a first network subscriber on the basis of a reference time, wherein the reference time is derived from a signal that is suitable for synchronization;
transmitting a synchronization instruction by the first network subscriber as a message in a next time slot of a time division multiple access ("TDMA")-based bus system following a reception time of the signal that is suitable for synchronization;
wherein the message is dependent on the first timer and comprises a current time that the first timer outputs when the message is produced or a current time that the first timer outputs when the message is produced and additionally incorporates an information about a latency between the reception time of the signal and a start of the time slot used for transmitting the message;
receiving the message that is dependent on the first timer that is existent in the first network subscriber by at least one second network subscriber when a predetermined condition is satisfied;
synchronizing a second timer in the second network subscriber on the basis of the message that is dependent on the first timer when the predetermined condition is satisfied;
wherein the predetermined condition is time-triggered;
wherein the time-triggered condition is the timing of the next time slot in the TDMA data transmission method in the network.

2. The method as claimed in claim 1, wherein the signal from which the reference time is derived is a wirelessly received signal.

3. The method as claimed in claim 2, wherein the wirelessly received signal is a global navigation satellite system ("GNSS") signal.

4. The method as claimed in claim 1 wherein the predetermined condition is event-triggered.

5. The method as claimed in claim 4, wherein the event-triggered condition is the output of a predetermined sensor signal.

6. A control apparatus comprising:
a first network subscriber having a first timer, the first network subscriber configured to synchronize the first timer of the first network subscriber on the basis of a reference time, wherein the reference time is derived from a signal that is suitable for synchronization;
the first network subscriber configured to transmit a synchronization instruction as a message in a next time slot of a time division multiple access ("TDMA")-based bus system following a reception time of the signal that is suitable for synchronization;
wherein the message is dependent on the first timer and comprises a current time that the first timer outputs when the message is produced or a current time that the first timer outputs when the message is produced and additionally incorporates an information about a latency between the reception time of the signal and a start of the time slot used for transmitting the message;
at least one second network subscriber having a second timer, the at least one second network subscriber configured to receive the message that is dependent on a first timer that is existent in the first network subscriber by at least one second network subscriber when a predetermined condition is satisfied;
the at least one second network subscriber configured to synchronize the second timer in the second network subscriber on the basis of the message that is dependent on the first timer when the predetermined condition is satisfied;
wherein the predetermined condition is time-triggered;
wherein the time-triggered condition is the timing of the next time slot in the TDMA data transmission method in the network.

7. The control apparatus of claim 6, wherein the predetermined condition is time-triggered.

8. The control apparatus of claim 6, wherein the predetermined condition is event-triggered.

9. A non-transitive computer readable medium having instructions stored thereon that, when executed by a computing device having a processor, configure the computing device:
synchronize a first timer of a first network subscriber on the basis of a reference time, wherein the reference time is derived from a signal that is suitable for synchronization;
transmit a synchronization instruction as a message in a next time slot of a time division multiple access ("TDMA")-based bus system following a reception time of the signal that is suitable for synchronization;
wherein the message is dependent on the first timer and comprises a current time that the first timer outputs when the message is produced or a current time that the first timer outputs when the message is produced and additionally incorporates an information about a latency between the reception time of the signal and a start of the time slot used for transmitting the message;
receive the message that is dependent on the first timer that is existent in the first network subscriber by at least one second network subscriber when a predetermined condition is satisfied, and
synchronize a second timer in the second network subscriber on the basis of the message that is dependent on the first timer when the predetermined condition is satisfied;
wherein the predetermined condition is time-triggered;
wherein the time-triggered condition is the timing of the next time slot in the TDMA data transmission method in the network.

10. The non-transitive computer readable medium of claim 9, wherein the predetermined condition is time-triggered.

11. The non-transitive computer readable medium of claim 9, wherein the predetermined condition is event-triggered.

12. A method for synchronizing network subscribers in an onboard network in a vehicle, the method comprising:
synchronizing a first timer of a first network subscriber on the basis of a reference time, wherein the reference time is derived from a signal that is suitable for synchronization;
transmitting by the first network subscriber a synchronization instruction as a message when a predetermined condition is satisfied;
receiving the message that is dependent on the first timer that is existent in the first network subscriber by at least one second network subscriber when the predetermined condition is satisfied;

synchronizing a second timer in the second network subscriber on the basis of the message that is dependent on the first timer when the predetermined condition is satisfied;

wherein the predetermined condition is event-triggered;

wherein the event-triggered condition is the output of a predetermined sensor signal;

wherein the message that is dependent on the first timer that is existent in the first network subscriber comprises a time of recognition of an event causing the event triggered condition or wherein the message that is dependent on the first timer that is existent in the first network subscriber comprises a time of recognition of an event causing the event triggered condition and additionally incorporates an information about a latency between the event and the time of the message being sent.

* * * * *